UNITED STATES PATENT OFFICE.

JOSÉ DE SEIXAS PALMA, OF MUNICH, GERMANY, ASSIGNOR TO CHEMISCHES UND SERUMTHERAPEUTISCHES LABORATORIUM, DR. HANS SCHRAUBE, IN WHICH JOSÉ DE SEIXAS PALMA AND DR. HANS SCHRAUBE ARE PARTNERS.

PREPARATION FOR INFECTING VERMIN WITH DISEASE.

1,178,941. Specification of Letters Patent. Patented Apr. 11, 1916.

No Drawing. Application filed February 28, 1913. Serial No. 751,234.

*To all whom it may concern:*

Be it known that I, José DE SEIXAS PALMA, a citizen of Portugal, residing at Munich, in the Kingdom of Bavaria, German Empire, have invented certain new and useful Improvements in Preparations for Infecting Vermin with Disease, of which the following is a specification.

It is affirmed by authoritative investigators that the causation of cholera disease by the cholera bacteria (vibrios) consists in the reduction of the nitrates, absorbed with food, to nitrites, which react with the hydrochloric acid in the stomach, with the result that nitrous acid is produced and attacks the wall of the digestive duct, so that the normal process of digestion is interrupted and the poison enters the system. It has been found that cultures of bacteria, pathogenic in relation to rats, also reduce nitrates to nitrites. I have established the fact that administration, to rats and mice, of small quantities of nitrates, harmless in themselves, accompanied by, or in conjunction with, pathogenic bacteria of the class referred to, results in the speedy death of the vermin. Even old cultures, no longer deadly when administered alone, produce death if nitrates are administered therewith or subsequently.

My invention consists in the method of and a preparation for destroying vermin by administration of nitrates in conjunction with administration of pathogenic bacteria, and in the manufacture of a preparation for that purpose.

I may carry the invention into effect by saturating bread or other suitable bait with a well developed culture of the bacteria such as *Bacterium Danysz*, and also with a very dilute solution of potassium nitrate (or other nitrate), or I may first use bait which has only been infected with the bacteria, and a day or a few days later use in the same place bait which has been saturated with the nitrate solution.

It will be seen that the method essentially differs from the administration of a poison, such as nitrates, and also from mere infection with pathogenic bacteria. The nitrate is used in so small a quantity that it is harmless in itself, and accordingly constitutes no danger to human beings or domestic animals. The bacteria cultures are also in themselves very frequently by no means deadly to the vermin, as they are taken in too small quantities to produce serious disease unaided, and their virulence is weakened in course of time. The deadly action of the bacteria is dependent on simultaneous or subsequent administration of nitrate, which is first converted into nitrite and then into nitrous acid, which attacks the wall of the digestive passage and enables even a small quantity of bacteria, of low vitality, to produce death of the infected animal.

My preparation is made as follows: A bouillon is made from meat extract and is allowed to cool until it becomes tepid. Then the bacteria culture is added, and the vessel is covered and left in a dark and moderately warm place forty-eight hours, so that the bacteria multiply. Shortly before using the preparation, the nitrate tablet is dissolved in the liquid containing the bacteria, after which a suitable bait, such as small pieces of white bread or a quantity of rolled oats are soaked in the liquid until thoroughly saturated with it.

What I claim as my invention and desire to secure by Letters Patent of the United States is:—

1. A preparation for killing rats and mice, comprising nitrates in conjunction with a culture of bacteria pathogenic in relation to rats and mice.

2. A preparation for killing rats and mice, comprising nitrates in conjunction with a culture of bacteria pathogenic with respect to rats and mice, the amount of said nitrates being sufficiently low to make said nitrates alone substantially harmless.

3. A preparation for killing rats and mice, consisting of bait containing nitrates, the amount of said nitrates being sufficiently low to make said nitrates alone substantially harmless, said bait also containing cultures of bacteria pathogenic with respect to rats and mice.

4. A preparation for killing rats and mice, consisting of bait containing nitrates, and separate bait containing cultures of bacteria pathogenic with respect to rats and mice.

5. A preparation for killing rats and mice, consisting of bait containing nitrates, the amount of said nitrates being sufficiently low to render them substantially harmless, and bait containing cultures of bacteria pathogenic with respect to rats and mice.

In testimony whereof I have affixed my signature in presence of two witnesses.

JOSÉ DE SEIXAS PALMA.

Witnesses:
HANS SCHRAUBE,
A. O. W. COTYE.